US012311776B2

(12) United States Patent
Das et al.

(10) Patent No.: US 12,311,776 B2
(45) Date of Patent: May 27, 2025

(54) ELECTRIC POWER SYSTEM AND METHOD

(71) Applicant: Transportation IP Holdings, LLC, Norwalk, CT (US)

(72) Inventors: Subhas Chandra Das, Bangalore (IN); Sarit Ratadiya, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 74 days.

(21) Appl. No.: 17/476,180

(22) Filed: Sep. 15, 2021

(65) Prior Publication Data

US 2023/0158895 A1    May 25, 2023

(51) Int. Cl.
*B60L 15/20* (2006.01)
*B60L 53/20* (2019.01)
*B60L 58/12* (2019.01)
*H02J 7/00* (2006.01)
*H02J 7/24* (2006.01)
*H02P 3/18* (2006.01)
*H02P 27/06* (2006.01)

(52) U.S. Cl.
CPC .......... *B60L 15/2009* (2013.01); *B60L 53/20* (2019.02); *B60L 58/12* (2019.02); *H02J 7/0048* (2020.01); *H02J 7/00712* (2020.01); *H02J 7/24* (2013.01); *H02P 3/18* (2013.01); *H02P 27/06* (2013.01)

(58) Field of Classification Search
CPC ...... B60L 15/2009; B60L 53/20; B60L 58/12; H02J 7/0048; H02J 7/00712; H02J 7/24; H02P 3/18; H02P 27/06
See application file for complete search history.

(56) References Cited

U.S. PATENT DOCUMENTS

| 4,093,900 A | 6/1978 | Plunkett |
| 7,940,016 B2 | 5/2011 | Donnelly |

(Continued)

FOREIGN PATENT DOCUMENTS

| DE | 10 2018 209761 A1 | 12/2019 | |
| EP | 1000796 A2 * | 5/2000 | .............. B60L 1/003 |

(Continued)

OTHER PUBLICATIONS

Extended European Search Report for corresponding EP Application No. 22188062.8-1012 dated Feb. 9, 2023 (7 pages).

(Continued)

*Primary Examiner* — Kawing Chan
(74) *Attorney, Agent, or Firm* — K&L Gates LLP

(57) ABSTRACT

An electric power system includes an inverter device coupled with a motor. The inverter device receives from the motor electric energy generated by dynamic braking of the motor. An energy storage device is coupled with the inverter device, and a variable resistive component is disposed between the inverter device and the energy storage device. The variable resistive component controls a direction of conduction of the electric energy from the inverter device toward the energy storage device, a resistive grid, or a system load. The variable resistive component controls the direction of conduction of the electric energy from the inverter device based on a first amount of the electric energy conducted from the inverter device, a transfer rate of the electric energy conducted from the inverter device, or one or more characteristics of the energy storage device.

23 Claims, 6 Drawing Sheets

(56) References Cited

U.S. PATENT DOCUMENTS

| | | | |
|---|---|---|---|
| 8,063,609 B2 | 11/2011 | Salasoo et al. | |
| 8,371,230 B2 | 2/2013 | Kumar | |
| 2005/0284676 A1 | 12/2005 | King et al. | |
| 2009/0066272 A1* | 3/2009 | Jobard | B60L 7/003 318/375 |
| 2011/0204720 A1 | 8/2011 | Daum et al. | |
| 2012/0038214 A1* | 2/2012 | King | B60L 58/20 307/77 |
| 2012/0316717 A1 | 12/2012 | Ruiz et al. | |
| 2014/0210398 A1* | 7/2014 | Powell | B60L 53/20 320/104 |
| 2018/0186357 A1 | 7/2018 | Deshpande et al. | |
| 2019/0299788 A1* | 10/2019 | Oyama | B60L 53/20 |
| 2019/0324486 A1* | 10/2019 | Jasmin | G06Q 50/06 |

FOREIGN PATENT DOCUMENTS

| | | |
|---|---|---|
| JP | 58183004 U | 12/1983 |
| JP | 2000354303 A | 12/2000 |
| JP | 2005168085 A | 6/2005 |
| JP | 2010110173 A | 5/2010 |
| JP | 2011239662 A | 11/2011 |
| JP | 2014171380 A | 9/2014 |
| JP | 2015019465 A | 1/2015 |
| JP | 2015029384 A | 2/2015 |
| JP | 2019097334 A | 6/2019 |
| JP | 2019140774 A | 8/2019 |
| JP | 2020115704 A | 7/2020 |
| JP | 2021044972 A | 3/2021 |
| JP | 2021141760 A | 9/2021 |
| WO | 2014021364 A1 | 2/2014 |

OTHER PUBLICATIONS

Extended European Search Report for corresponding EP Application No. 32150719.5 dated Jun. 26, 2023 (20 pages).

First Office Action mailed Dec. 22, 2023 for corresponding Japanese Patent Application No. 2023-1302 (16 pages).

* cited by examiner

ELECTRIC POWER SYSTEM AND METHOD

BACKGROUND

Technical Field

The subject matter described herein relates to a vehicle system having an electric power system and related method.

DISCUSSION OF ART

In some battery electric systems (e.g., vehicles, stationary systems, or the like) the battery may have limited power absorbing capabilities at different instances due to various factors. These factors may include a state-of-charge level, an allowable transfer rate of power, or the like. In systems that generate electric energy during dynamic braking of the system, some of the braking power that is generated needs to be dissipated into a resistance grid, or may be directed toward system loads (e.g., propulsion loads, non-propulsion loads, or the like). Within power systems that have a fixed resistance value, a fixed amount of power loss may occur at the battery voltage and the remaining power may be used to charge the battery. For example, there may be no control over the battery charging power. Additionally, in systems where the power system is not connected with a resistive grid, the power system may have no control over the power that is fed to the battery (e.g., irrespective of the battery state-of-charge).

For example, FIG. 1 illustrates a schematic of an existing electric power system 100 of a vehicle system. The power system includes a motor 102, such as a traction motor, that is electrically coupled with an inverter 104. The electric power system also includes a resistive component 112 that is electrically coupled with and disposed between the inverter, an energy storage device 110 (e.g., a battery or the like), and a vehicle load or resistive grid 106. The resistive component may be a fixed resistive component such that the resistive component may direct electric energy in a single direction.

The motor may generate electric energy (e.g., braking power) that is generated by dynamic braking of the motor of the vehicle system. As the speed of movement of the vehicle system increases, the amount of electric energy needed to brake or slow movement of the vehicle system decreases, and excess electric energy is directed from the motor, through the inverter, and toward the resistive component. The resistive component includes a switch 114 that controls a direction of conduction (e.g., flow, movement, or the like) of the electric energy from the motor. The electric energy may be directed in a first direction 116 toward the energy storage device while the switch is in the open position, or the electric energy may be directed in a second direction 118 toward the vehicle load or grid while the switch is in the closed position. Optionally, the electric power system may be devoid the resistive component and the vehicle load or resistive grid, and thereby all of the electric energy from the motor may be directed toward the energy storage device.

The position of the switch between the open position and closed position is based on a voltage of the energy storage device 122 relative to a DC link voltage 120. When the vehicle load or grid is connected to the DC link (e.g., as shown in FIG. 1), the grid power is a function of the voltage of the energy storage device and the grid resistance, and an energy storage charge power is based on the electric energy (e.g., braking power) of the vehicle system and the grid power. For example, the grid power cannot be controlled, so the energy storage charge power is the remaining power after grid dissipation. Alternatively, when the vehicle load or grid is not connected to the DC link, all of the electric energy (e.g., braking power) is directed to the energy storage device regardless of a state-of-charge of the energy storage device.

FIG. 2 illustrates a graph 130 of operating the electric power system shown in FIG. 1. In the illustrated embodiment of FIG. 2, the vehicle load or grid is connected with the DC link. The graph includes a vertical axis 132 representative of power (e.g., volts) and a horizontal axis 134 representative of a speed of movement of the vehicle system (e.g., miles per hour). A data line 136 represents the DC link voltage of the electric energy from the motor, a data line 138 represents an amount of available electric energy generated by dynamic braking of the motor of the vehicle system (e.g., braking power), a data line 140 represents an amount of electric energy directed toward the vehicle load or resistive grid, and a data line 142 represents an amount of electric energy directed toward the energy storage device of the vehicle system.

While the voltage of the energy storage device is greater than the DC link voltage, the switch is in the closed position and the electric energy is directed toward the vehicle load or grid. As the speed of movement of the vehicle system increases, the braking power generated by the vehicle system and the corresponding DC link voltage increase. The position of the switch moves to the open position responsive to the DC link voltage increasing to a level that is substantially equal to or greater than the voltage of the energy storage device.

For example, as the speed of the vehicle system increases, the amount of power coming through the inverter from the motor changes. From a speed $S_0$ to a speed $S_1$, the voltage across the DC link is less than the voltage of the energy storage device, and therefore the switch of the resistive component remains in a closed position and the electric energy is directed toward the vehicle load or grid (e.g., data line 140). As the speed of movement of the vehicle system increases, the voltage across the DC link changes. At the speed of movement $S_1$, the voltage across the DC link changes such that the voltage across the DC link is greater than the voltage of the energy storage device, causing the switch of the resistive component shown in FIG. 1 to change from the closed position to the open position, and the electric energy is directed toward the energy storage device.

However, the energy storage device may be capable of absorbing more electric energy than is directed toward the energy storage device. For example, electric energy is only directed toward the energy storage device after grid or load dissipation, and therefore the amount of power from the motor that is directed toward the energy storage device may not be optimized. Alternatively, when the vehicle load or grid is not connected with the DC link, the electric energy from the motor to the energy storage device may not be controlled. For example, the energy storage device may receive an amount of electric energy regardless of the state-of-charge of the energy storage device; or the energy storage device may receive electric energy at a rate that is greater than a rate the energy storage device may be capable of receiving. It may be desirable to have a system and method that differs from those that are currently available.

BRIEF DESCRIPTION

In one or more embodiments of the subject matter described herein, an electric power system includes an inverter device coupled with a motor. The inverter device receives from the motor electric energy generated by dynamic braking of the motor. An energy storage device is coupled with the inverter device, and a variable resistive component is disposed between the inverter device and the energy storage device. The variable resistive component controls a direction of conduction of the electric energy from the inverter device toward one or more of the energy storage device, a resistive grid, or a system load. The variable resistive component controls the direction of conduction of the electric energy from the inverter device based on one or more of a first amount of the electric energy conducted out from the inverter device, a transfer rate of the electric energy conducted from the inverter device, or one or more characteristics of the energy storage device.

In one or more embodiments of the subject matter described herein, a method includes receiving electric energy generated by dynamic braking of a motor from an inverter device, and controlling a direction of conduction of the electric energy from the inverter device toward one or more of an energy storage device, a resistive grid, or a system load. The direction of conduction of the electric energy is based on one or more of a first amount of the electric energy conducted out from the inverter device, a transfer rate of the electric energy conducted from the inverter device, or one or more characteristics of the energy storage device.

In one or more embodiments of the subject matter described herein, a method includes receiving electric energy generated by dynamic braking of a motor from an inverter device, determining a state of charge of an energy storage device, and operating a variable resistive component in a first mode of operation or in a second mode of operation. In the first mode of operation, the variable resistive component directs a first amount of the electric energy from the inverter device toward the energy storage device, and in the second mode of operation, the variable resistive component directs a second amount of electric energy from the inverter device toward the energy storage device.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
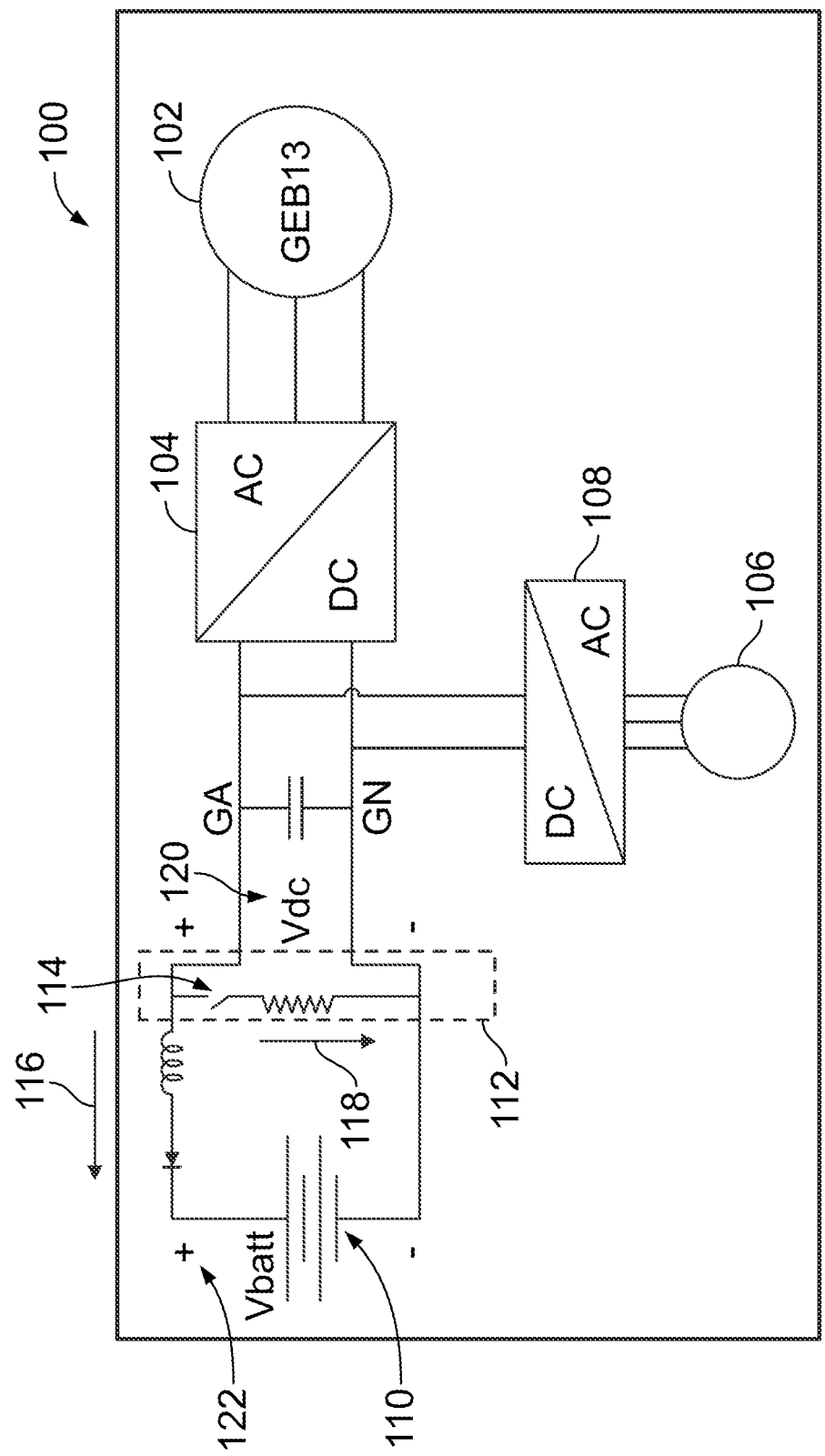
FIG. 1 illustrates an example of a schematic of an electric power system of a vehicle system.

Embodiments of the subject matter described herein relate to an electric power system and method of operation. The electric power system may include an inverter device coupled with a motor of an electrical system, an energy storage device coupled with the inverter device, and a variable resistive component may be disposed between the inverter device and the energy storage device. In one embodiment, the electrical system may include a motor and may be parts of a vehicle system. A suitable motor may be a traction motor that, in one mode of operation propels the vehicle, and in another mode of operation generates electric energy. The traction motor may generate electricity by dynamically braking the vehicle system. The variable resistive component may control a direction of conduction of the electric energy from the motor via the inverter device toward the energy storage device and/or one or more of a resistive grid or a vehicle load. An embodiment of the electric power system described herein may prioritize directing electric energy toward the energy storage device over directing electric energy toward the resistive grid for dissipation and/or a vehicle load.

The variable resistive component may control operation of the electric power system to operate in one or more different modes of operation. The different modes of operation may control the direction of conduction or flow of the electric energy, and amount of the electric energy that may be directed toward the energy storage device, a resistive grid, or a system load (e.g., a vehicle system load). In one embodiment, in a first mode of operation, the variable resistive component may direct all of the electric energy toward the energy storage device. In another embodiment, in a second mode of operation, the variable resistive component may direct some of the electric energy toward the energy storage device and some of the electric energy toward one or both of the resistive grid or the system load. In another embodiment, in a third mode of operation, the variable resistive component may direct all of the electric energy toward one of the resistive grid or the system load, or direct a portion of the electric energy toward the resistive grid and another portion of the electric energy toward the system load.

In one or more embodiments, the direction of conduction of the electric energy from the inverter device may be based on an amount of electric energy from the inverter device, a transfer rate of the electric energy from the inverter device, or a characteristic of the energy storage device. The characteristic of the energy storage device may be and/or include a total amount of electric energy the energy storage device may be capable of receiving, a transfer rate of the energy storage device, the type of energy storage device (e.g., make, model, or the like), an age of the energy storage device, a length of time of operation of the energy storage device (e.g., an accumulative amount of time the energy storage device has been operated, a length of time the energy storage device has been operated in one or more operations of the electric power system), or the like. In one example, the variable resistive component may direct all of the electric energy toward the energy storage device. In another example, the variable resistive component may direct a portion of electric energy toward the energy storage device and another portion of electric energy toward a resistive grid and/or a vehicle load (e.g., a propulsion load of the vehicle system and/or a non-propulsion load of the vehicle system). The amount of electric energy directed toward the resistive grid and/or vehicle load may be a remaining portion of a total amount of electric energy from the inverter device.

The amount of electric energy directed toward the energy storage device may change based on changes to the dynamic braking of the vehicle system. Optionally, the amount of electric energy directed toward the energy storage device may change based on a state-of-charge of the energy storage device. In one or more embodiments, the state-of-charge of the energy storage device may change during operation of the vehicle system. Optionally, the amount of electric energy directed toward the energy storage device may change based on a classification (e.g., type, make, model, age, or the like) of the energy storage device.

In one or more embodiments, the amount of electric energy from the inverter device may change responsive to changes in the dynamic braking of the vehicle system. The variable resistive component may change the direction of conduction of electric energy based on the new amount of electric energy from the inverter device. Optionally, the variable resistive component may change an amount of a first portion of the electric energy that is directed toward the energy storage device. Changing the amount of the first portion of the electric energy changes the amount of a second portion of the electric energy that is directed toward the resistive grid and/or the vehicle load. For example, a portion of the electric energy may be directed toward the energy storage device, and a remaining portion of the total amount of electric energy may be directed toward one or both of a resistive grid or vehicle load.

In one embodiment, the electrical system may be a vehicle system. A suitable vehicle system may be a propulsion-generating vehicle. Examples of suitable vehicle systems may include a rail vehicle, an automobile, a truck, a bus, a mining vehicle, a marine vessel, an aircraft (manned or unmanned, such as a drone), an agricultural vehicle, industrial equipment, or another off-highway vehicle. Suitable rail vehicles may include a locomotive, a switcher, a shunter, and the like. Optionally, the vehicle system may be a marine vessel or aircraft and may be devoid wheels. For example, the vehicle system may move along a waterway, in a flight path, or the like. In one embodiment, the vehicle system is a single vehicle. In other embodiments, the vehicle system may include two or more vehicles that may travel together. Group movement may be accomplished by the vehicles being mechanically coupled together, or by being mechanically separate but logically or virtually coupled and communicating with each other to travel together, such as in a train, convoy, consist, group, swarm, platoon, fleet, and the like. At least one vehicle of the vehicle system may be a propulsion-generating vehicle, and optionally the vehicle system may include one or more non-propulsion generating vehicles.

Figure 3:
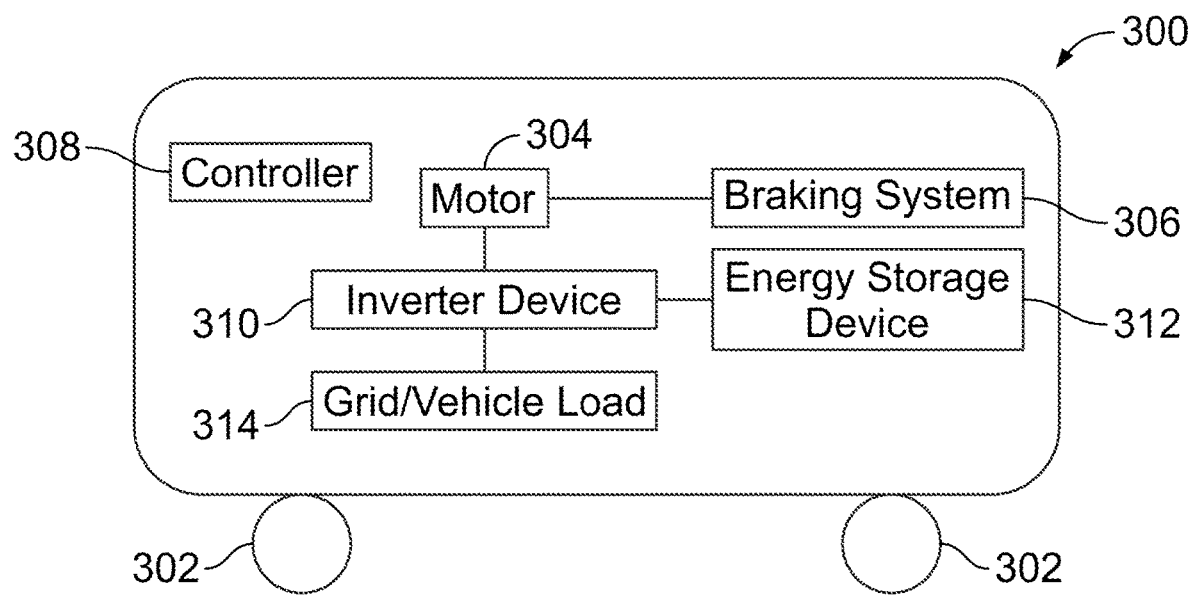
FIG. 3 illustrates a vehicle system in accordance with one embodiment.

FIG. 3 illustrates a vehicle system 300 in accordance with one embodiment. In the illustrated embodiment, the vehicle system may be a single vehicle that includes plural wheels 302 in contact with a route along which the vehicle system moves. The vehicle system may include a controller 308 disposed onboard the vehicle system. The controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion system such as a motor 304 (e.g., traction motor, engine, or the like) and braking systems 306. The controller may be manually operated by receiving instruction signals from an input device (not shown) (e.g., a device that receives input from an operator such as, but not limited to, a touchscreen, a joystick, a keyboard, a switch, a wheel, a microphone, or the like) based on manually input from an operator at the input device. An output device (not shown) can provide information to the operator, such as current operational settings of the vehicle system, designated operational settings of a trip plan, a current amount of electric energy stored onboard the vehicle system, a current storage capacity of an onboard energy storage device 312, or the like.

In one or more embodiments, the controller may be automatically operated to autonomously control operations of the vehicle system. For example, a trip plan may be provided by an energy management system (not shown) and/or stored in a tangible and non-transitory computer readable storage medium, or memory (not shown), that is accessible by the controller. The controller and the energy management system may represent two or more control modules in one or more embodiments. The trip plan may designate operational settings of the vehicle system as a function of time or distance along the route for a trip of the vehicle system to a destination location. The designated operational settings of the trip plan may be established in order to reduce one or more of fuel consumed, emissions generated, or time spent in transit by the vehicle system for the trip. The energy management system may include one or more processors, microcontrollers, or other logic-based devices, and/or associated software or instructions, for carrying out one or more operations described herein.

The tractive components operably coupled with the propulsion and/or brake systems (e.g., traction motors, brakes such as air brakes, or the like) may control movement of the wheels 302 (and/or axles joined to the wheels, not shown) of the vehicle system to generate tractive efforts to propel the vehicle system along a route. In addition to providing propulsion force to propel the vehicle system, the propulsion and/or brake systems can act to slow or stop movement of the vehicle system using dynamic braking.

The propulsion and/or brake systems may be electrically powered by electric energy (e.g., electric current) supplied by one or more onboard and/or off-board power sources. For example, the vehicle system may be referred to as hybrid vehicle system such that the vehicle system may be powered by an off-board external power source, an onboard power source, or a combination of the external and onboard power sources. With respect to an onboard power sources, the vehicle system may include the onboard energy storage device 312 and/or a power source (not shown) such as one or more fuel cells, batteries, or the like. The onboard power sources also or alternatively can include one or more onboard energy sources (not shown) that generates electric current onboard the vehicle. For example, the onboard energy source may include a generator and/or alternator that may be connected to the motor 304 by a shaft. Rotation of the shaft by the motor rotates a rotor of the generator to create electric energy (e.g., electric current).

In one or more embodiments, the onboard energy sources may include another type of device that generates or stores electric energy onboard the vehicle, such as one or more solar cells, wind turbines, or the like. In another example, the onboard energy sources may include the traction motors of the propulsion system when the traction motors operate in a dynamic braking mode where electric energy is generated by the traction motors during slowing of the vehicle system. At least some electric energy generated by the dynamic braking can be provided to the onboard energy storage device for storage. Additionally or alternatively, at least some electric energy generated by the dynamic braking can be provided to a system load (e.g., a vehicle load) and/or resistive grid 314. In one or more embodiments, the vehicle load may be an auxiliary load of the vehicle system (e.g., a non-propulsion load such as air-conditioning, coach lighting, passenger power outlet supply, or the like) of the vehicle system and/or other vehicles operably coupled with the vehicle system. Optionally, the vehicle load may be a propulsion load of the vehicle system and/or other vehicles operably coupled with the vehicle system.

While the onboard energy storage device is shown as being disposed onboard the vehicle system and operably coupled with the propulsion and brake systems via an inverter device 310, alternatively, the onboard energy storage device may be disposed onboard another vehicle that is coupled with the vehicle system 300. For example, the energy storage device may be located on an energy tender vehicle that is connected with the vehicle system 300 by one or more mechanical connections such that movement of the vehicle system also moves the tender vehicle. Such an energy storage device can be connected with the propulsion system of the vehicle system by one or more conductive bodies (e.g., buses, cables, wires, or the like).

The energy storage device can directly supply electric current to the traction motor(s) of the propulsion system to power the motors by being directly coupled with the traction motors (e.g., with no intermediate conductive buses, transformer, or the like, disposed between the energy storage device and the motors). Alternatively or additionally, the energy storage device can indirectly supply the electric current to the traction motors by conveying the current to the motors through one or more conductive buses, transformers, or the like. Optionally, the energy storage device can directly and/or indirectly supply electric current to the inverter device of the vehicle system, to a converter device (not shown), or the like. Also, optionally, the energy storage device may directly and/or indirectly supply electric current to one or more different vehicles operably coupled with (e.g., mechanically and/or logically) the vehicle system to power one or more systems of the different vehicles.

Figure 4:
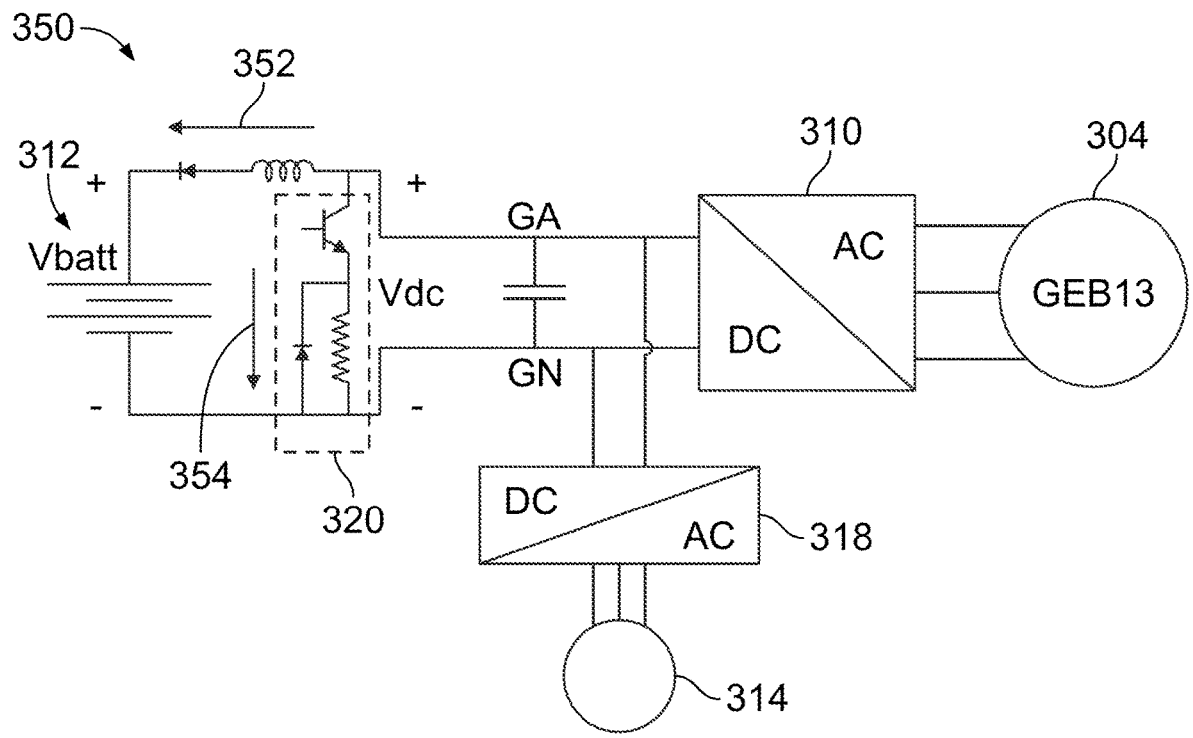
FIG. 4 illustrates a schematic of an electric power system in accordance with one embodiment.

FIG. 4 illustrates a schematic of an electric power system 350 in accordance with one embodiment. The electric power system controls the conduction of electric energy from the motor that is generated by dynamic braking of the vehicle system. In one or more embodiments, some of the electric energy generated by the dynamic braking may in excess of the amount of braking power needed to slow or stop movement of the vehicle system. For example, as the speed of movement of the vehicle system increases, the amount of electric energy needed to brake (e.g., slow or stop) movement of the vehicle system decreases, and the excess electric energy (e.g., braking power) may be directed toward one or more of the onboard energy storage device or the resistive grid or vehicle load of the vehicle system.

The resistive grid may represent a device into which electric energy is dissipated. A portion of electric energy may be directed toward the resistive grid and another portion of electric energy may be directed toward the vehicle load. Optionally, the vehicle system may not include or may be disconnected from a resistive grid, and the electric energy may be directed toward the vehicle load. In one or more embodiments, the portion of electric energy may be directed to plural different vehicle loads (e.g., propulsion and/or non-propulsion loads). Optionally, some electric energy may be directed to one or more different vehicle loads, and some electric energy may be dissipated in the resistive grid.

The electric power system may include the motor 304 (e.g., traction motor) and inverter device 310 (corresponding to the motor and inverter device shown in FIG. 3). The inverter device receives electric energy from the motor that is generated by dynamic braking of the vehicle system. The electric power system may include the energy storage device 312, the resistive grid and/or vehicle load 314, and the auxiliary inverter 318 electrically coupled with the resistive grid and/or vehicle load.

The electric power system may include a variable resistive component 320 that is disposed between the inverter device, the energy storage device, and the resistive grid and/or vehicle load. In one or more embodiments, the variable resistive component may be referred to as a chopper or chopper circuit. The variable resistive component controls a direction of conduction of the electric energy from the inverter device to one or both of the energy storage device or the resistive grid and/or vehicle load. For example, the variable resistive component may direct a first portion 352 of the electric energy toward the energy storage device, and/or may direct a second portion 354 of the electric energy toward the resistive grid and/or vehicle load. The variable resistive component may operate in one or more different modes of operation to control the direction of conduction of the electric energy from the inverter device. The mode of operation of the variable resistive component, and the resulting direction of conduction of the electric energy, may be based on an amount of electric energy from the inverter device, a transfer rate of the electric energy from the inverter device (e.g., a rate at which electric energy is directed from the inverter device), or one or more characteristics of the energy storage device (e.g., a state of charge of the energy storage device, a total amount of energy the energy storage device may hold, a make and/or model of the energy storage device, an age of the energy storage device, a rate at which the energy storage device may receive electric energy, or the like).

In one or more embodiments, the electric power system may include a banking device (not shown) electrically coupled with the energy storage device. The banking device may be a fuel cell, a capacitor bank, or other storage device that may temporarily receive and hold the electric energy directed toward the energy storage device. For example, the banking device may be disposed between the variable resistive component and the energy storage device. The banking device may receive the electric energy from the variable resistive component and may store, hold, maintain, or the like, the electric energy intended for the energy storage device. The banking device may direct at least some electric energy toward the energy storage device responsive to the state of charge of the energy storage device reaching a predetermined threshold. For example, the energy storage device may have a state of charge and/or have an amount of energy that prohibits the receipt of more electric energy. The banking device may temporarily hold or maintain some electric energy until the state of charge of the energy storage device reduces to a predetermined threshold, indicating the energy storage device being capable and/or allowed to receive more electric energy.

Figure 5:
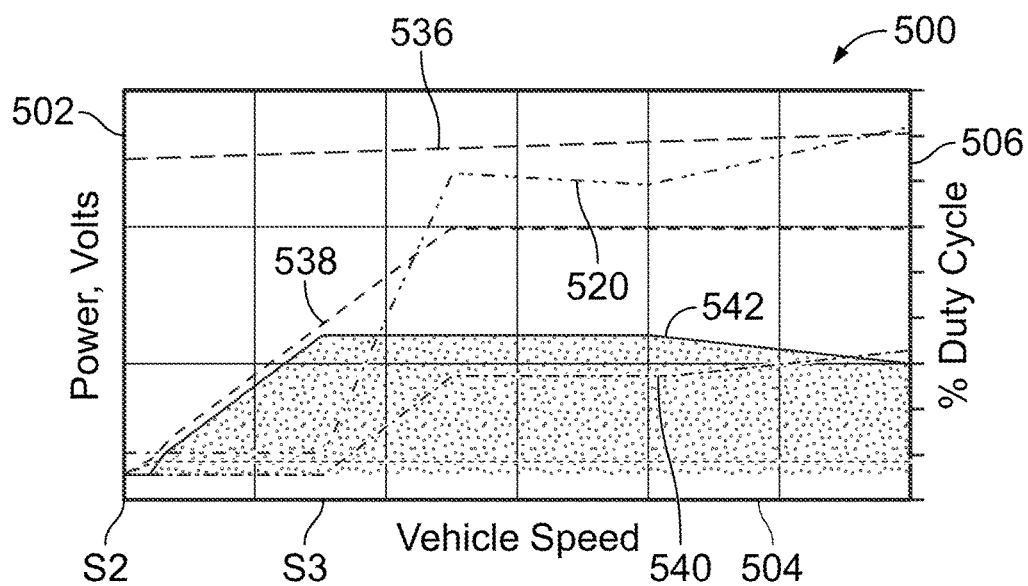
FIG. 5 illustrates a graph of the schematic shown in FIG. 4 in accordance with one embodiment.

FIG. 5 illustrates a graph 500 of the schematic of the electric power system shown in FIG. 4 in accordance with one embodiment. The graph illustrates the distribution of the electric energy between the energy storage device and/or the resistive grid/vehicle load based on one or more operating conditions of the vehicle system. The graph may include a horizontal axis 504 representative of a speed of movement of the locomotive (e.g., miles per hour), a first vertical axis 502 representative of increasing power, and a second vertical axis 506 representative of increasing percentages of a duty cycle of the variable resistive component.

A data line 520 represents a duty cycle of the variable resistive component. The duty cycle may be used to determine the amount of electric energy that is directed toward the resistive grid and/or vehicle load. The controller may calculate the duty cycle of the variable resistive component based on plural factors. First, an estimated power to be dissipated in the resistive grid and/or vehicle load may be based on an amount of power generated by the vehicle system by dynamic braking, a charging current of the energy storage device, and a voltage of the energy storage device. The duty cycle may be based on the estimated power to be dissipated in the grid, the charging current of the energy storage device, the voltage of the energy storage device, a grid resistance, an internal resistance of the energy storage device, and any additional stray resistance of the electric power system.

A data line 536 represents a voltage level of the battery and the voltage of the DC link, where the voltage of the battery is substantially equal to (within 5% of) the voltage of the DC link of the electric power system. A data line 538 represents an electric energy (e.g., brake power) generated by dynamic braking of the vehicle system. A data line 542 represents an amount of electric energy directed toward the energy storage device (e.g., the energy storage device charge power). A data line 540 represents an amount of electric energy directed toward the resistive grid and/or vehicle load of the vehicle system.

The electric power system shown in FIG. 4 prioritizes the energy storage device over the resistive grid and/or vehicle load. For example, the electric power system may direct all of the electric energy toward the energy storage device first, and subsequently direct some of the electric energy toward the resistive grid and/or vehicle load responsive to the state of charge of the energy storage device reaching a predetermined threshold. For example, in the illustrated embodiment, from the speed of movement $S_2$ to the speed $S_3$, the variable resistive component operates in a first mode of operation and the electric power system directs all of the electric energy toward the energy storage device. At increasing speeds from the speed $S_3$, the variable resistive component changes operating modes from the first mode of operation to operate in a second mode of operation and the electric power system directs the first portion of the electric energy toward the energy storage device and simultaneously directs the second portion of the electric energy toward the resistive grid and/or vehicle load. The amount of electric energy within the first portion and/or the second portion may be based on one or more factors and/or characteristics of the vehicle system, the energy storage device, the resistive grid and/or vehicle load, or the like.

With regard to the duty cycle, it may determine, or at least be a factor for, the amount of electric energy of the first portion that is directed toward the energy storage device and the amount of electric energy that is directed toward the resistive grid and/or vehicle load. The amount of electric energy of the first portion (e.g., directed toward the energy storage device) may be based on changes to the dynamic braking of the vehicle system (e.g., the amount of power generated by the vehicle system by dynamic braking), a state-of-charge of the energy storage device (e.g., the charging current of the energy storage device), a type or classification of the energy storage device (e.g., one model of an energy storage device may have a charging capacity that is greater than another model of another energy storage device; one model may have a transfer rate of electric energy that the model may receive that is different than a transfer rate of another model of an energy storage device, or the like), or the like. In one or more embodiments, the total amount and/or the transfer rate of the energy storage device may be based on the state-of-charge of the energy storage device, and the state-of-charge of the energy storage device may change during operation of the vehicle system. For example, the state-of-charge may decrease (e.g., the amount of current stored within the energy storage device) as some of the current stored within the energy storage device is used within one or more systems (propulsion and/or non-propulsion systems) of the vehicle system.

In one embodiment, the controller may determine and/or calculate the amount of electric energy that is directed toward the resistive grid and/or vehicle load based on the following equation:

$$P_g = P_{brake} - P_b (\text{if} P_{brake} > P_b) \qquad \text{Eq. 1}$$

In equation 1, $P_g$ represents the resistive grid power, $P_{brake}$ represents the total electric energy (e.g., braking power) indicated by data line 538, and $P_b$ represents the energy storage device (e.g., battery) power. Equation 1 may be used to determine an amount of electric energy that is directed to the resistive grid and/or vehicle load of the vehicle system when the acceptable capacity of the energy storage device (e.g., $P_b$) is less than the brake power ($P_{brake}$). For example, the energy storage device may be able to contain or withhold a predetermined amount of electric energy used to power one or more systems onboard the vehicle system (e.g., propulsion systems and/or non-propulsion systems, or the like).

Alternatively, the controller may change the mode of operation of the variable resistive component to change the direction of conduction, or the amount of electric energy directed to one or both of the energy storage device or the resistive grid and/or vehicle load based on the total amount of electric energy the variable resistive component receives from the inverter device, and the total amount of electric energy changing responsive to changes in the dynamic braking of the vehicle system. For example, if the total amount of electric energy is less than the acceptable capacity of the energy storage device, the amount of electric energy directed toward the resistive grid and/or vehicle load may be based on the following equation:

$$P_g = D * V_{batt}^2 / R_{grid} (\text{if} P_{brake} < P_b) \qquad \text{Eq. 2}$$

Figure 2:
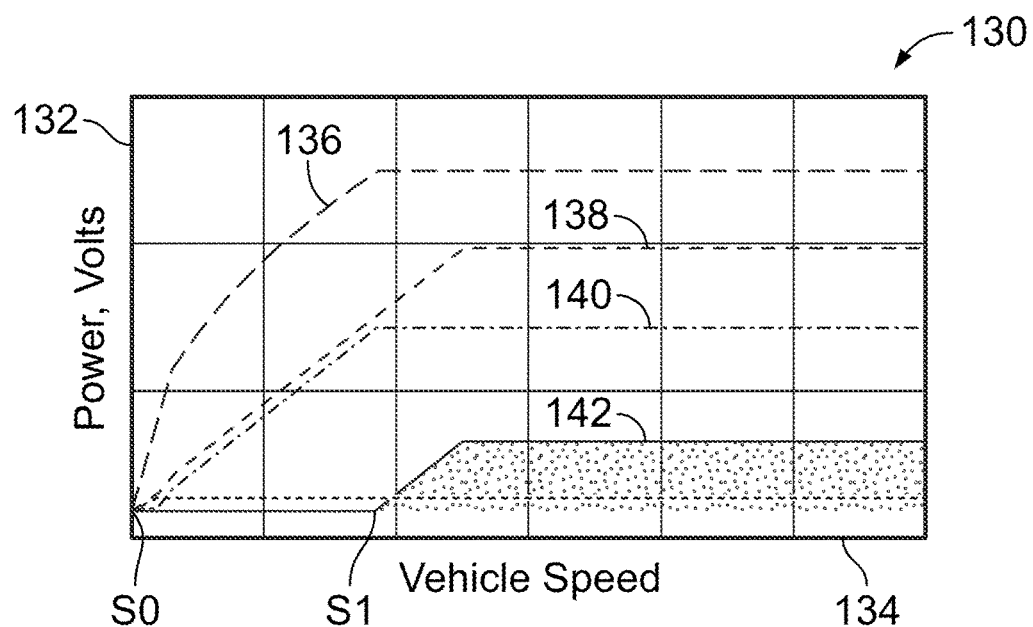
FIG. 2 illustrates a graph of the schematic shown in FIG. 1.

In equation 2, D represents the duty cycle of the variable resistive component (e.g., the chopper of the electric power system), $V_{batt}$ represents the voltage of the energy storage device, and $R_{grid}$ represents a resistance of the resistive grid and/or vehicle load. For example, unlike the graph shown in FIG. 2, the electric power system shown in FIG. 4 prioritizes directing electric energy toward the energy storage device, and secondarily directs some of the electric energy toward the resistive grid and/or vehicle load of the vehicle system. Additionally, as the duty cycle percentage increases (e.g., at increasing speeds of movement of the vehicle system) the amount or portion of electric energy directed toward the resistive grid and/or vehicle load increases. For example, the amount of electric energy directed toward the resistive grid and/or the vehicle load may change responsive to the amount of electric energy directed toward the energy storage device changing.

In one or more embodiments, the controller of the vehicle system may monitor the total amount of electric energy generated by dynamic braking of the vehicle system and/or the state-of-charge of the energy storage device. Optionally, the controller may automatically (e.g., without operator input) control operation of the variable resistive component to change operating modes of the variable resistive component. Changing operating modes of the variable resistive component changes the direction of conduction of the electric energy, changes the amount of electric energy directed toward the energy storage device, and/or changes the amount of electric energy directed toward the resistive grid and/or vehicle load of the vehicle system.

In one embodiment, the controller may control operation of the variable resistive component to operate in a first mode of operation to direct all of the electric energy toward the energy storage device. In another embodiment, the controller may control operation of the variable resistive component to operate in a second mode of operation to direct at least some electric energy toward the energy storage device and at least some electric energy toward one or both of the resistive grid or the vehicle load. The amount of electric energy directed toward the energy storage device while the variable resistive component operates in the second mode of operation may change based on the state of charge of the energy storage device, the amount of electric energy from the inverter device, or the like. In another embodiment, the controller may control operation of the variable resistive component to operate in a third mode of operation to direct all of the electric energy toward the resistive grid or the vehicle load, or direct some electric energy toward the resistive grid and direct some electric energy toward the vehicle load.

The controller may change the operating mode of the variable resistive component responsive to the total amount of electric energy changing, exceeding a predetermined threshold, or dropping below a predetermined lower limit threshold. Optionally, the controller may indicate to an operator of the vehicle system (e.g., onboard and/or offboard the vehicle system) that the mode of operation of the variable resistive component needs to be changed. Optionally, the controller may direct the operator how to manually change the mode of operation of the variable resistive component.

Figure 6:
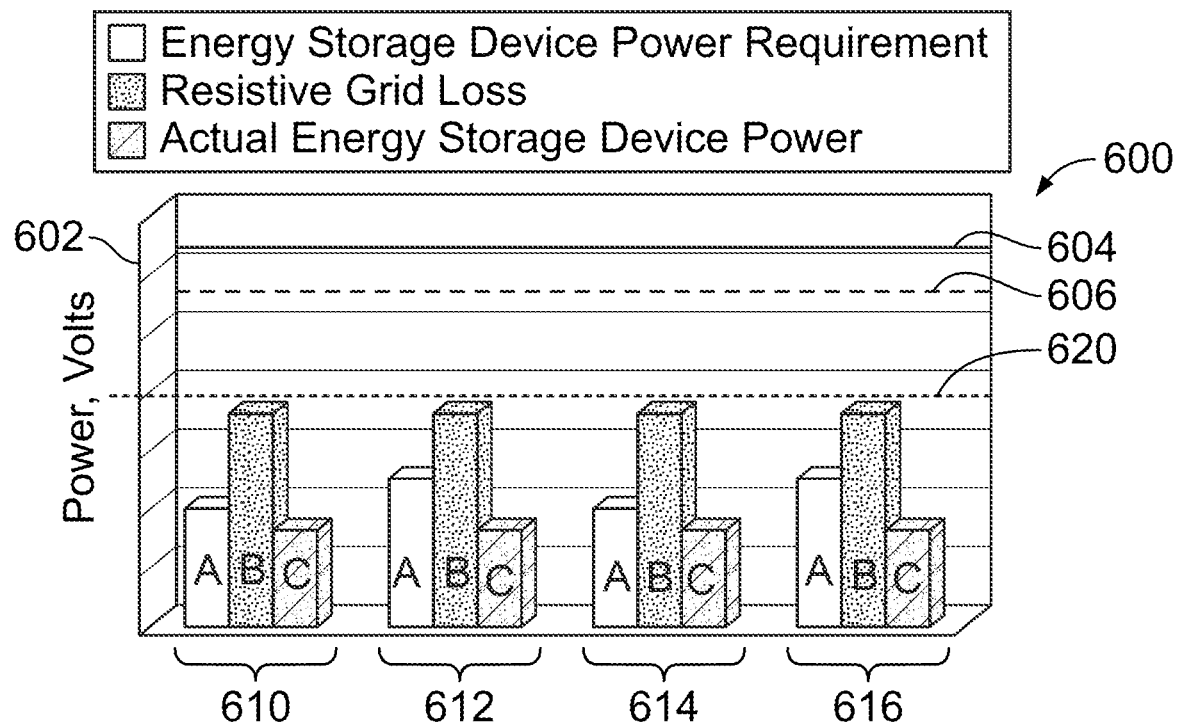
FIG. 6 illustrates a bar graph of operating the electric power system shown in FIG. 1 under first operating conditions.
Figure 7:
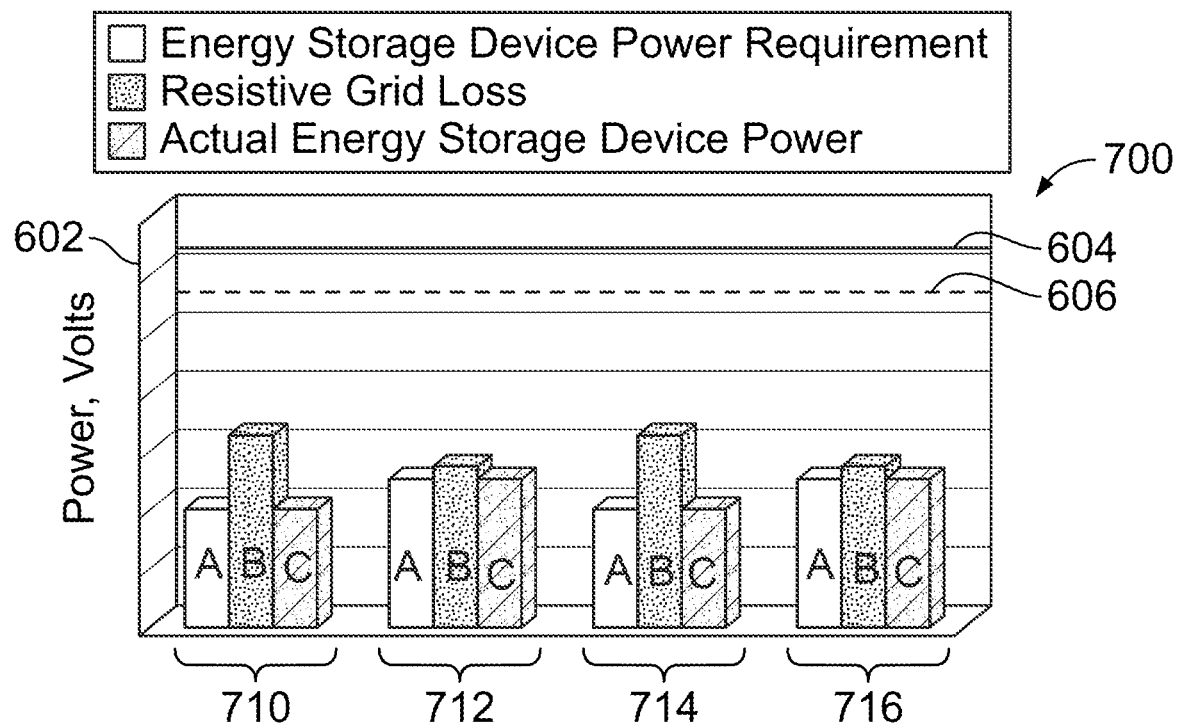
FIG. 7 illustrates a bar graph of operating the electric power system shown in FIG. 4 under the first operating conditions.

FIG. 6 illustrates a bar graph 600 responsive to operating the electric power system shown in FIG. 1 under first operating conditions. FIG. 7 illustrates a bar graph 700 responsive operating the electric power system shown in FIG. 4 under the same first operating conditions. As one example, the first operating conditions of the vehicle system may include operating the vehicle system to generate about 1050 horsepower (hp) per each axle(s) of the vehicle system. The graphs 600 and 700 include a vertical axis 602 representative of increasing power. A data line 604 represents an axle power limit and a data line 606 represents a nominal electric energy (e.g., brake power) generated by dynamic braking per axle. In the illustrated embodiments of FIGS. 6 and 7, the resistive grid and/or vehicle load are electrically connected with electric power systems shown in FIGS. 1 and 4, respectively.

Bars 610 and 710 represent axle 1 of the vehicle system, bars 612 and 712 represent axle 2 of the vehicle system, bars 614 and 714 represent axle 3 of the vehicle system, and bars 616 and 716 represent axle 4 of the vehicle system. Bars A of each axle represent an amount of electric energy required by the energy storage device, Bars B of each axle represent an amount of electric energy that is directed toward the resistive grid for dissipation (e.g., resistive grid loss), and Bars C of each axle represent the actual amount of electric energy received by the energy storage device.

As shown in graph 600, a line 620 indicates that substantially the same amount of electric energy generated by each axle 610, 612, 614, and 616 is directed toward and dissipated into the resistive grid. Additionally, as shown in FIG. 6, each axle fails to achieve the power requirement of the energy storage device compared to the actual amount of power directed toward the energy storage device. For example, Bars A of axles 610, 612, 614, and 616 are greater than or larger than Bars C of axles 610, 612, 614, and 616. The actual amount of electric energy (e.g., power) generated by each axle 610-616 is less than the electric energy (e.g., power) requirement of the energy storage device. For example, the energy storage device is capable of receiving more electric energy than the energy storage device is actually receiving. The electric power system shown in FIG. 1 may selectively prioritize the resistive grid ahead of the energy storage device.

Alternatively, as shown in graph 700, the electric power system shown in FIG. 4 prioritizes the energy storage device over the resistive grid and/or vehicle load. For example, Bars A of axles 710, 712, 714, and 716 are substantially the same as Bars C of axles 710, 712, 714, and 716. The energy storage device receives an amount of electric energy that is substantially the same as the amount of electric energy the energy storage device requires. For example, the energy storage device receives an amount of electric energy that is the same or substantially the same as the amount of electric energy the energy storage device is capable of receiving. Additionally, the amount of electric energy that is directed toward the resistive grid and/or vehicle load varies between axles 710, 712, 714, and 716. For example, the variable resistive component controls the amount of electric energy that is directed toward the energy storage device and the amount of electric energy that is directed toward the resistive grid and/or vehicle load, and prioritizes the energy storage device over the resistive grid and/or vehicle load.

Figure 8:
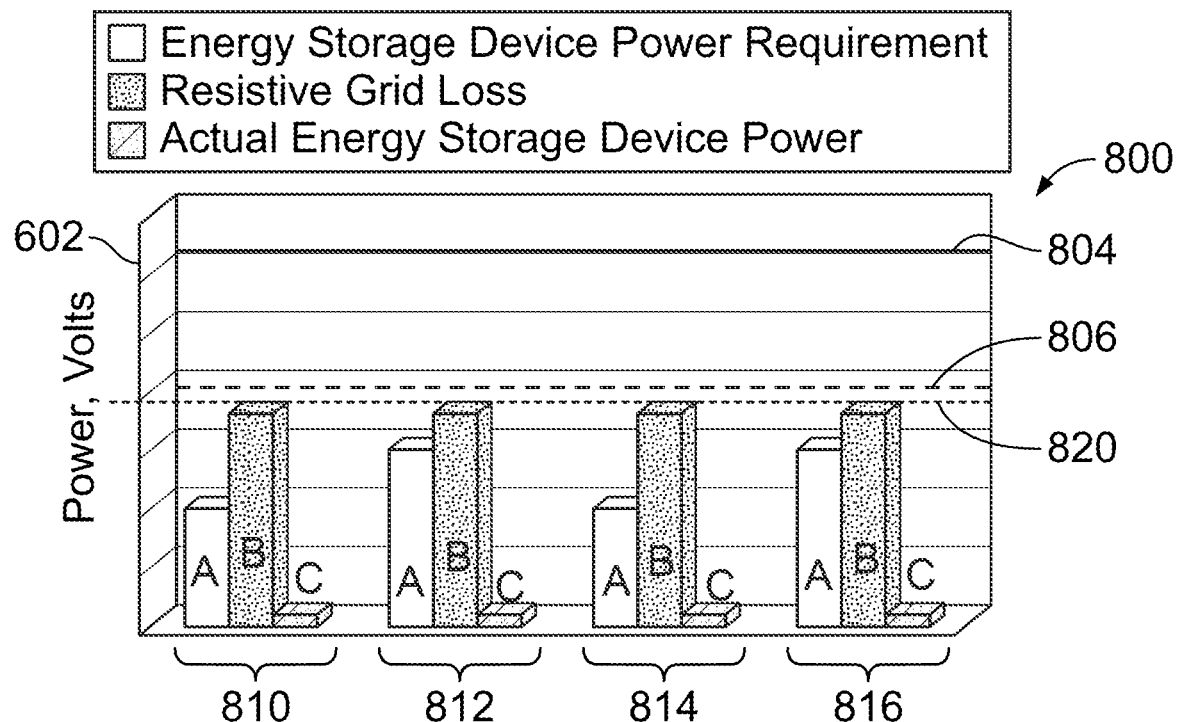
FIG. 8 illustrates a bar graph of operating the electric power system shown in FIG. 1 under second operating conditions.
Figure 9:
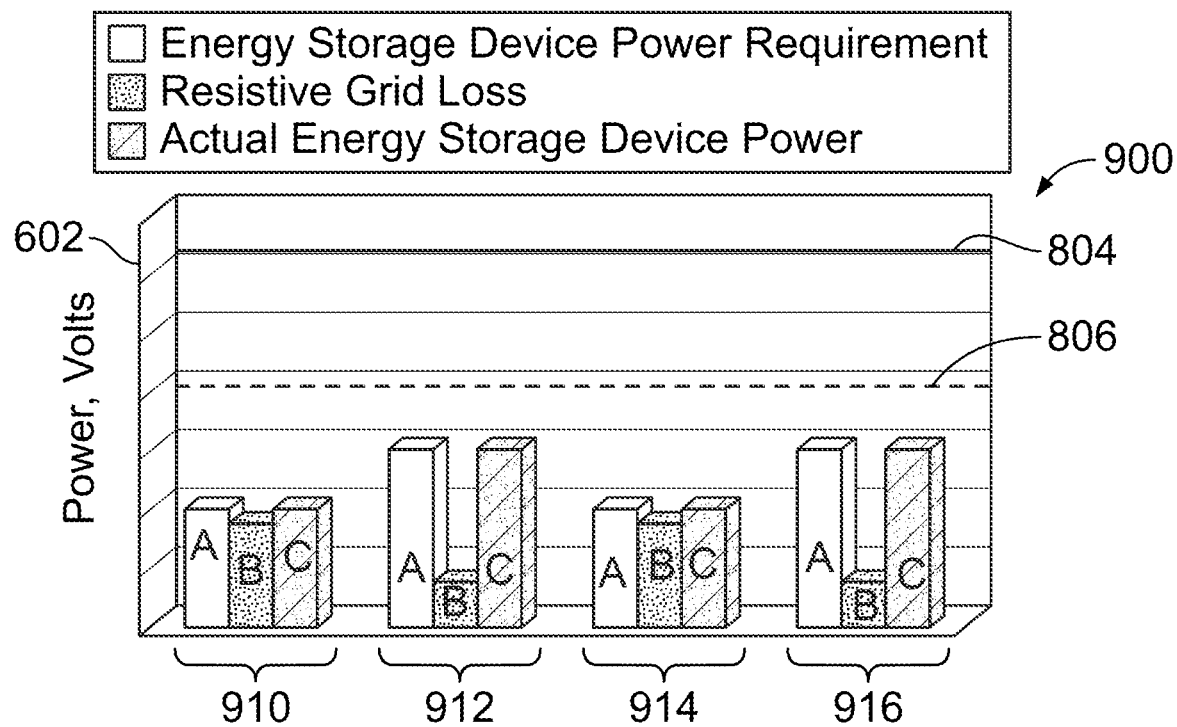
FIG. 9 illustrates a bar graph of operating the electric power system shown in FIG. 4 under the second operating conditions.

FIG. 8 illustrates a bar graph 800 responsive to operating the electric power system shown in FIG. 1 under second operating conditions. FIG. 9 illustrates a bar graph 900 responsive operating the electric power system shown in FIG. 4 under the same second operating conditions. As one example, the second operating conditions of the vehicle system may include operating the vehicle system to generate about 750 horsepower (hp) per each axle of the vehicle system. Like the graphs 600 and 700, the graphs 800 and 900 include the vertical axis 602 representative of increasing power. A data line 804 represents an axle power limit and a data line 806 represents a nominal electric energy (e.g., brake power) generated by dynamic braking per axle. In the illustrated embodiments of FIGS. 8 and 9, the resistive grid and/or vehicle load are electrically connected with electric power systems shown in FIGS. 1 and 4, respectively.

Bars 810 and 910 represent axle 1 of the vehicle system, bars 812 and 912 represent axle 2 of the vehicle system, bars 814 and 914 represent axle 3 of the vehicle system, and bars 816 and 916 represent axle 4 of the vehicle system. Bars A of each axle represent an amount of electric energy required by the energy storage device, Bars B of each axle represent an amount of electric energy that is directed toward the resistive grid for dissipation (e.g., resistive grid loss), and Bars C of each axle represent the actual amount of electric energy received by the energy storage device.

Similar to graph 600, graph 800 may include a line 820 that indicates that substantially the same amount of electric energy generated by each axle 810, 812, 814 and 816 is directed toward and dissipated into the resistive grid. Additionally, each axle fails to achieve the power requirement of the energy storage device compared to the actual amount of power that is directed toward the energy storage device. For example, Bars A of axles 810, 812, 814, and 816 are greater than Bars C of axles 810, 812, 814, and 816. The actual amount of electric energy generated by each axle is less than the electric energy requirement of the energy storage device. For example, the energy storage device is capable of receiving more electric energy than the energy storage device is actually receiving. The electric power system shown in FIG. 1 prioritizes the resistive grid ahead of the energy storage device.

Alternatively, similarly to graph 700, graph 900 indicates that the electric power system shown in FIG. 4 prioritizes the energy storage device over the resistive grid and/or vehicle load. For example, Bars A of axles 910, 912, 914, and 916 are substantially the same as Bars C of axles 910, 912, 914, and 916. The energy storage device receives an amount of electric energy that is substantially the same as the amount of electric energy the energy storage device requires. Additionally, the amount of electric energy that is directed toward the resistive grid and/or vehicle load varies as shown by Bars B of the axles 910, 912, 914, and 916. For example, the variable resistive component controls the amount of electric energy that is directed toward the energy storage device and the amount of electric energy that is directed toward the resistive grid and/or vehicle load, and prioritizes the energy storage device over the resistive grid and/or vehicle load.

In one or more embodiments, the vehicle system may include one or more axles, and each axle may be connected with an energy storage device. For example, a first axle may be connected with a first energy storage device, and a second axle may be connected with a second energy storage device. The first energy storage device may receive electric power generated by dynamic braking of the first axle, and the second energy storage device may receive electric power generated by dynamic braking of the second axle. Optionally, the vehicle system may include multiple axles, and each axle may be connected with a single energy storage device. For example, the single energy storage device may receive electric energy from each of the multiple axles of the vehicle system.

Figure 10:
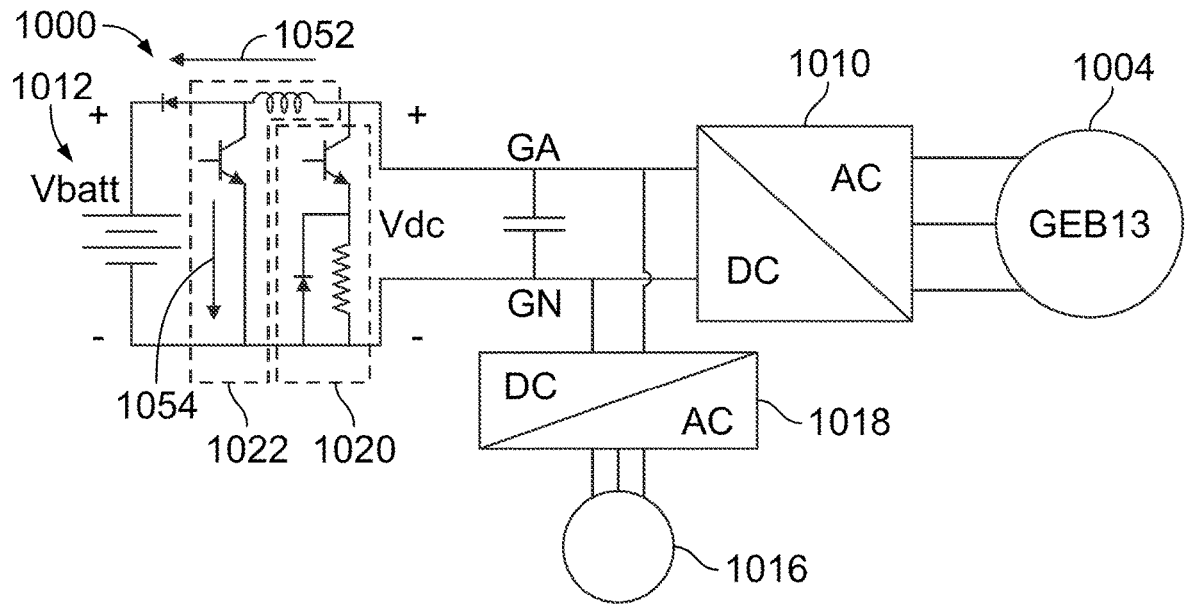
FIG. 10 illustrates a schematic of an electric power system in accordance with one embodiment.

FIG. 10 illustrates a schematic of an electric power system 1000 in accordance with one embodiment. Like the electric power system shown in FIG. 4, the electric power system 1000 may include a motor 1004 (e.g., traction motor) and inverter device 1010. The inverter device receives electric energy from the motor that is generated by dynamic braking of the vehicle system. The electric power system also may include the energy storage device 1012, a resistive grid and/or vehicle load 1016, and an auxiliary inverter 1018 electrically coupled with the resistive grid and/or vehicle load. The electric power system may include a variable resistive component 1020 disposed between the inverter device, the energy storage device, and the resistive grid and/or vehicle load and controls a direction of conduction of electric energy from the inverter device toward one or both of the energy storage device or the resistive grid and/or auxiliary load. For example, a first portion 1052 of the electric energy may be directed toward the energy storage device, and/or a second portion 1054 of the electric energy may be directed toward the resistive grid and/or vehicle load (or to the vehicle load when the vehicle system is disconnected from a resistive grid).

The electric power system also may include a boost circuit 1022 disposed between the variable resistive component and the energy storage device. In one embodiment, the boost circuit may change a voltage of the portion of the electric energy that is directed toward the energy storage device. For example, the portion of the electric energy directed toward to the resistive grid and/or vehicle load may have a first voltage or first voltage level, and the portion of the electric energy directed toward the energy storage device may have a different, second voltage or second voltage level.

Figure 11:
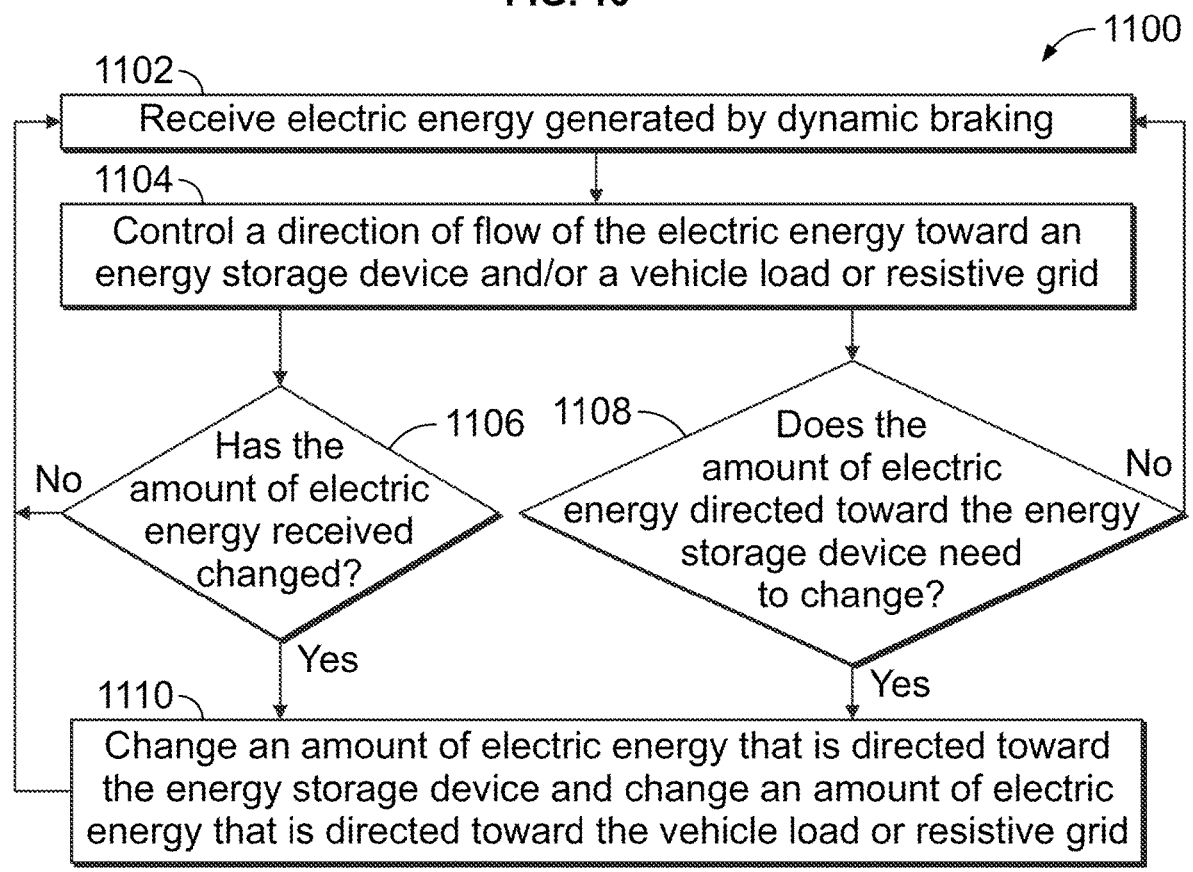
FIG. 11 illustrates a flowchart of one example of controlling conduction of electric energy generated by dynamic braking of a vehicle system in accordance with one embodiment.

FIG. 11 illustrates a flowchart 1100 of one example of controlling conduction of electric energy generated by dynamic braking of a vehicle system in accordance with one embodiment. At step 1102, electric energy may be received and directed through a variable resistive component of an electric power system from a motor (e.g., traction motor) via an inverter device. The electric energy may be generated by dynamic braking of the vehicle system. At step 1104, the variable resistive component controls a direction of conduction of the electric energy toward one or both of an energy storage device or a resistive grid and/or vehicle load.

As one example, a controller of the vehicle system may determine that variable resistive component is to operate in a mode of operation to direct all of the electric energy toward the energy storage device. In one embodiment, the controller may determine that the variable resistive component is to operate in another mode of operation to direct a first portion of the electric energy toward the energy storage device, and a second portion of the electric energy toward the resistive grid and/or vehicle load. In other embodiments, the amount of electric energy directed toward the energy storage device may be based, at least in part, on a total amount of electric energy received from the motor via the inverter device. In one embodiment, the amount of electric energy directed toward the energy storage device may be based on a state-of-charge of the energy storage device. In one embodiment, the amount of electric energy directed toward the energy storage device may be based on a classification (e.g., type, make, model, age, or the like) of the energy storage device. In one embodiment, the amount of electric energy directed toward the energy storage device may be based on a transfer rate of the energy storage device. In one embodiment, the amount of electric energy directed toward the energy storage device may be based on other characteristics of the vehicle system, the energy storage device, an electric energy requirement of one or more vehicle loads (e.g., propulsion and/or non-propulsion loads), or the like.

At step 1106, the controller determines whether the amount of electric energy received by the variable resistive component has changed. Additionally or alternatively, at step 1108 the controller determines whether the amount of electric energy directed toward the energy storage device needs to change. As one example, the amount of electric energy directed toward the energy storage device may need to change based on a current state-of-charge of the energy storage device, the total amount of electric energy from the motor, electric energy requirements of one or more vehicle loads, or the like. If the amount of electric energy from the motor has not changed, and/or if the amount of electric energy directed toward the energy storage does not need to change, then flow of the method returns toward step 1102.

Alternatively, if one or both of the total of amount of electric energy received from the motor has changed, or the amount of electric energy directed toward the energy storage device needs to change, flow of the method proceeds toward step 1110. At step 1110, the controller controls the variable resistive component to change modes of operation and to change the amount of the portion of the electric energy that is directed toward the energy storage device, and to change the amount of the portion of the electric energy that is directed toward the resistive grid and/or vehicle load. For example, the amount of electric energy directed toward the resistive grid and/or the vehicle load may change responsive to the amount of electric energy directed toward the energy storage device changing. Flow of the method returns toward step 1102, and may continue to repeat while the vehicle system is in operation.

In one or more embodiments of the subject matter described herein, an electric power system includes an inverter device coupled with a motor. The inverter device receives from the motor electric energy generated by dynamic braking of the motor. An energy storage device is coupled with the inverter device, and a variable resistive component is disposed between the inverter device and the energy storage device. The variable resistive component controls a direction of conduction of the electric energy from the inverter device toward one or more of the energy storage device, a resistive grid, or a system load. The variable resistive component controls the direction of conduction of the electric energy from the inverter device based on one or more of a first amount of the electric energy conducted out from the inverter device, a transfer rate of the electric energy conducted from the inverter device, or one or more characteristics of the energy storage device.

Optionally, the variable resistive component may direct conduction a first portion of the electric energy toward the energy storage device and direct conduction of a second portion of the electric energy toward the one or more of the resistive grid or the system load.

Optionally, the inverter device may receive a changing second amount of the electric energy from the motor based on changes to the dynamic braking of the motor.

Optionally, the variable resistive component may direct a changing amount of the electric energy of the first portion toward the energy storage device based on a state-of-charge of the energy storage device.

Optionally, the variable resistive component may direct a changing amount of the electric energy of the first portion toward the energy storage device based on a classification of the energy storage device.

Optionally, the one or more characteristics of the energy storage device may include a total amount of electric energy the energy storage device is capable of receiving or a transfer rate of the energy storage device.

Optionally, the total amount of electric energy the energy storage device is capable of receiving or the transfer rate of the energy storage device may be based on a state-of-charge of the energy storage device.

Optionally, the variable resistive component may change the direction of conduction of the electric energy based on the first amount of electric energy conducted from the inverter device changing responsive to changes in the dynamic braking of the motor.

Optionally, the electric power system may include a boost circuit disposed between the variable resistive component and the energy storage device. The boost circuit may change a voltage of the electric energy directed toward the energy storage device.

Optionally, an operator may control operation of the variable resistive component to change one or more of the direction of conduction of the electric energy, an amount of electric energy directed toward the energy storage device, or an amount of electric energy directed toward the one or more of the resistive grid or the system load.

Optionally, the system load may be one or more of an auxiliary load of a vehicle system or a propulsion load of the vehicle system.

In one or more embodiments of the subject matter described herein, a method includes receiving electric energy generated by dynamic braking of a motor from an inverter device, and controlling a direction of conduction of the electric energy from the inverter device toward one or more of an energy storage device, a resistive grid, or a system load. The direction of conduction of the electric energy is based on one or more of a first amount of the electric energy conducted out from the inverter device, a transfer rate of the electric energy conducted from the inverter device, or one or more characteristics of the energy storage device.

Optionally, the method may include controlling the direction of conduction of the electric energy based on a mode of operation of a variable resistive component. A first amount of electric energy is configured to be conducted toward the energy storage device responsive to the variable resistive component operating in a first mode of operation, and a second amount of electric energy is configured to be conducted toward the energy storage device responsive to the variable resistive component operating in a second mode of operation.

Optionally, the method may include changing the mode of operation of the variable resistive component based on one or more of changes to the dynamic braking of the motor, a state of charge of the energy storage device, or a classification of the energy storage device.

In one or more embodiments of the subject matter described herein, a method includes receiving electric energy generated by dynamic braking of a motor from an inverter device, determining a state of charge of an energy storage device, and operating a variable resistive component in a first mode of operation or in a second mode of operation. In the first mode of operation, the variable resistive component directs a first amount of the electric energy from the inverter device toward the energy storage device, and in the second mode of operation, the variable resistive component directs a second amount of electric energy from the inverter device toward the energy storage device.

Optionally, the first amount of the electric energy may be directed toward a banking device configured to store the first amount of the electric energy for the energy storage device. The banking device may direct at least some of the direct amount of the electric energy toward the energy storage device responsive to the state of charge of the energy storage device reaching a predetermined threshold.

Optionally, operating the variable resistive component in the second mode of operation includes directing at least some of the electric energy toward the energy storage device and directing at least some of the electric energy toward one or more of a resistive grid or a system load.

Optionally, the system load may be one or more of an auxiliary load of a vehicle system or a propulsion load of the vehicle system.

Optionally, a transfer rate of the electric energy directed toward the energy storage device may be controlled based on one or more of a transfer rate at which the energy storage device may receive the electric energy, a total amount of the energy storage device, the state of charge of the energy storage device, or one or more characteristics of the energy storage device.

Optionally, operation of the variable resistive component may be changed from the first mode of operation to the second mode of operation responsive to the state of charge of the energy storage device reaching a predetermined threshold.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory.

The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the claims if they have structural elements that do not differ from the literal language of the clauses, or if they include equivalent structural elements with insubstantial differences from the literal language of the claims.

What is claimed is:

1. An electric power system comprising:
an inverter device coupled with a motor, the inverter device configured to receive electric energy generated by dynamic braking of the motor;
an energy storage device coupled with the inverter device;
a variable resistive component disposed between the inverter device and the energy storage device and configured to receive the electric energy conducted out from the inverter device, the variable resistive component configured to control an amount and a direction of conduction of the electric energy from the inverter device toward one or more of the energy storage device, a resistive grid, or a system load, the variable resistive component disposed between the energy storage device and the resistive grid or the system load, wherein the variable resistive component is configured to direct a non-zero amount of a first portion of the electric energy towards the energy storage device and direct a non-zero amount of a second portion of the electric energy towards one or more of the resistive grid or the system load, wherein the non-zero amount of the first portion of the electric energy and the non-zero amount of the second portion of the electric energy are based at least in part on a mode of operation of the variable resistive component; and
a controller configured to control operation of the variable resistive component to change the mode of operation of the variable resistive component, wherein changing the mode of operation of the variable resistive component changes the non-zero amount of the first portion of the electric energy configured to be directed towards the energy storage device and changes the non-zero amount of the second portion of the electric energy configured to be directed towards one or more of the resistive grid or the system load, wherein the controller is configured to change the mode of operation of the variable resistive component based on transfer rate of the electric energy conducted from the inverter device.

2. The electric power system of claim 1, wherein the inverter device is configured to receive a change to the amount of the electric energy from the motor based on changes to the dynamic braking of the motor.

3. The electric power system of claim 1, wherein the controller is configured to control operation of the variable resistive component to control the amount of the first portion of the electric energy directed toward the energy storage device based at least in part on a state-of-charge of the energy storage device.

4. The electric power system of claim 1, wherein the controller is configured to control operation of the variable resistive component to control the amount of the first portion of the electric energy directed toward the energy storage device based at least in part on a classification of the energy storage device.

5. The electric power system of claim 1, further comprising a boost circuit disposed between the variable resistive component and the energy storage device, the controller configured to control operation of the boost circuit to change a voltage of the first portion of the electric energy directed toward the energy storage device.

6. The electric power system of claim 1, wherein an operator is configured to control operation of the variable resistive component to control one or more of the amount of the first portion of the electric energy directed toward the energy storage device or the amount of the second portion of the electric energy directed toward the one or more of the resistive grid or the system load.

7. The electric power system of claim 1, wherein the system load is one or more of an auxiliary load of a vehicle system or a propulsion load of the vehicle system.

8. The electric power system of claim 1, wherein the inverter device, the energy storage device, and the variable resistive component are configured to be disposed onboard a vehicle system.

9. The electric power system of claim 1, wherein the controller is configured to change the mode of operation of the variable resistive component further based on one or more of:
a received amount of the electric energy conducted out from the inverter device; and
one or more characteristics of the energy storage device.

10. The electric power system of claim 9, wherein the one or more characteristics of the energy storage device includes a total amount of electric energy the energy storage device is capable of receiving or the transfer rate of the energy storage device.

11. The electric power system of claim 10, wherein the one or more of the total amount of electric energy the energy storage device is capable of receiving or the transfer rate of the energy storage device is based on a state-of-charge of the energy storage device.

12. The electric power system of claim 9, wherein the controller is configured to control operation of the variable resistive component to one or more of change the direction of conduction of the electric energy or change the amount of the first portion of the electric energy directed toward the energy storage device based on the received amount of the electric energy conducted from the inverter device changing responsive to changes in the dynamic braking of the motor.

13. A method comprising:
receiving electric energy generated by dynamic braking of a motor from an inverter device; and
controlling an amount and a direction of conduction of the electric energy from the inverter device toward one or more of an energy storage device, a resistive grid, or a system load based on a mode of operation of a variable resistive component, the variable resistive component disposed between the inverter device and the energy storage device, wherein the variable resistive component is configured to direct a non-zero amount of a first portion of the electric energy toward the energy storage device and direct a non-zero amount of a second portion of the electric energy toward one or more of the resistive grid or the system load, the variable resistive component disposed between the energy storage device and the resistive grid or the system load, wherein the mode of operation of the variable resistive component is changed based on transfer rate of the electric energy conducted from the inverter device.

14. The method of claim 13, further comprising changing the mode of operation of the variable resistive component based on one or more changes to the dynamic braking of the motor.

15. The method of claim 14, further comprising changing the mode of operation of the variable resistive component based on one or more of a state of charge of the energy storage device or a classification of the energy storage device.

16. The method of claim 13, wherein the mode of operation of the variable resistive component is changed further based on one or more of:
a received amount of the electric energy conducted out from the inverter device; and
one or more characteristics of the energy storage device.

17. A method comprising:
receiving electric energy generated by dynamic braking of a motor of a vehicle system from an inverter device;
determining a state of charge of an energy storage device; and
controlling a mode of operation of a variable resistive component based on the state of charge of the energy storage device, wherein the variable resistive component is configured to direct a non-zero amount of a first portion of the electric energy toward the energy storage device and direct a non-zero amount of a second portion of the electric energy toward one or more of a resistive grid or a system load, wherein the variable resistive component is configured to be disposed between the inverter device and the energy storage device, wherein the variable resistive component is configured to be disposed between the energy storage device and the resistive grid or the system load, wherein the mode of operation of the variable resistive component is changed based on transfer rate of the electric energy conducted from the inverter device.

18. The method of claim 17, further comprising directing the non-zero amount of the first portion of the electric energy toward a banking device, the banking device configured to store the first portion of the electric energy for the energy storage device, and the banking device configured to direct at least some of the first portion of the electric energy toward the energy storage device responsive to the state of charge of the energy storage device reaching a predetermined threshold.

19. The method of claim 17, further comprising changing the mode of operation of the variable resistive component based on one or more changes to the dynamic braking of the motor.

20. The method of claim 17, wherein the system load is one or more of an auxiliary load of the vehicle system or a propulsion load of the vehicle system.

21. The method of claim 17, further comprising controlling a transfer rate of the first portion of the electric energy directed toward the energy storage device based on one or more of a transfer rate at which the energy storage device can receive the electric energy, the state of charge of the energy storage device, or one or more characteristics of the energy storage device.

22. The method of claim 17, further comprising changing the mode of operation of the variable resistive component responsive to the state of charge of the energy storage device reaching a predetermined threshold.

23. The method of claim 17, wherein the mode of operation of the variable resistive component is changed further based on one or more of:
a received amount of the electric energy conducted out from the inverter device; and
one or more characteristics of the energy storage device.

* * * * *